(12) United States Patent
Lin et al.

(10) Patent No.: US 12,252,350 B2
(45) Date of Patent: Mar. 18, 2025

(54) ANTI-FALL MECHANISM AND LIFTING TRANSPORT APPARATUS

(71) Applicants: Guangdong SC Intelligent Equipment Co., Ltd., Huizhou (CN); Guangdong Lyric Robot Automation Co., Ltd., Huizhou (CN)

(72) Inventors: Weixin Lin, Huizhou (CN); Yulin Cai, Huizhou (CN); Yajie Duan, Huizhou (CN); Yongjia Yang, Huizhou (CN); Zhen Yang, Huizhou (CN)

(73) Assignees: GUANGDONG SC INTELLIGENT EQUIPMENT CO., LTD., Huizhou (CN); GUANGDONG LYRIC ROBOT AUTOMATION CO., LTD., Huizhou (CN)

( * ) Notice: Subject to any disclaimer, the term of this patent is extended or adjusted under 35 U.S.C. 154(b) by 0 days.

(21) Appl. No.: 18/279,832

(22) PCT Filed: Dec. 19, 2022

(86) PCT No.: PCT/CN2022/140038
§ 371 (c)(1),
(2) Date: Aug. 31, 2023

(87) PCT Pub. No.: WO2023/185113
PCT Pub. Date: Oct. 5, 2023

(65) Prior Publication Data
US 2025/0026580 A1    Jan. 23, 2025

(30) Foreign Application Priority Data

Mar. 31, 2022   (CN) .......................... 202210331686.7

(51) Int. Cl.
*B65G 43/06*    (2006.01)
*B65G 17/12*    (2006.01)
(Continued)

(52) U.S. Cl.
CPC ........... *B65G 43/06* (2013.01); *B65G 41/003* (2013.01); *B66F 7/02* (2013.01); *B66F 17/00* (2013.01); *B65G 17/123* (2013.01); *B66F 9/07* (2013.01)

(58) Field of Classification Search
CPC .... B65G 43/06; B65G 41/003; B65G 17/123; B66F 7/02; B66F 17/00; B66F 9/07
See application file for complete search history.

(56) References Cited

U.S. PATENT DOCUMENTS

| 2,266,915 A | * | 12/1941 | Steedman | B66F 7/02 187/209 |
| 2,624,546 A | * | 1/1953 | Haumerson | B66F 7/02 187/204 |

(Continued)

FOREIGN PATENT DOCUMENTS

| CN | 108910764 A | 11/2018 |
| CN | 212712610 U | 3/2021 |

(Continued)

OTHER PUBLICATIONS

International Search Report dated Feb. 27, 2023 from International Application No. PCT/CN2022/140038.
(Continued)

*Primary Examiner* — Mark A Deuble
(74) *Attorney, Agent, or Firm* — Daylight Law, P.C.

(57) ABSTRACT

An anti-fall mechanism and a lifting transport apparatus are disclosed. The anti-fall mechanism includes a conveying platform, a linkage, an elastic mechanism, a limit switch and a self-locking mechanism. The conveying platform is installed on a lifting belt. The linkage includes a first coupler, a second coupler and two rockers, where two ends of the first coupler are rotationally coupled to two ends of the second coupler, respectively, via the rockers. The elastic mechanism is arranged between the conveying platform and the lifting belt, where one end of the elastic mechanism is connected to the first coupler, and the other end of the elastic mechanism is pressed by the lifting belt. The limit switch is arranged on the second coupler. The self-locking mechanism is arranged on the conveying platform and capable of (Continued)

locking and securing the conveying platform to a frame of the lifting transport apparatus.

17 Claims, 5 Drawing Sheets

(51) Int. Cl.
    *B65G 41/00*     (2006.01)
    *B66F 7/02*     (2006.01)
    *B66F 9/07*     (2006.01)
    *B66F 17/00*     (2006.01)

(56) References Cited

U.S. PATENT DOCUMENTS

| | | | | |
|---|---|---|---|---|
| 5,433,292 | A * | 7/1995 | Haymore | B66F 9/07518 |
| | | | | 187/235 |
| 6,371,449 | B1 * | 4/2002 | Chamberlain | B66F 7/02 |
| | | | | 254/323 |
| 10,415,309 | B2 * | 9/2019 | Liu | B66F 11/04 |
| 12,110,709 | B2 * | 10/2024 | Smith | B66F 7/08 |
| 2018/0339858 | A1 * | 11/2018 | Iwata | B65G 1/0435 |
| 2023/0166925 | A1 * | 6/2023 | Byun | B66F 11/00 |
| | | | | 187/226 |

FOREIGN PATENT DOCUMENTS

| | | | |
|---|---|---|---|
| CN | 212769741 U | 3/2021 | |
| CN | 212799494 U | 3/2021 | |
| CN | 113582087 A | 11/2021 | |
| DE | 202020002480 U1 | 7/2020 | |
| EP | 4261178 A1 * | 10/2023 | B66F 17/00 |
| JP | 2004323187 A | 11/2004 | |

OTHER PUBLICATIONS

Written Opinion dated Feb. 27, 2023 from International Application No. PCT/CN2022/140038.

* cited by examiner

ANTI-FALL MECHANISM AND LIFTING TRANSPORT APPARATUS

CROSS-REFERENCE TO RELATED APPLICATIONS

This application is a national stage filing under 35 U.S.C. § 371 of international application number PCT/CN2022/140038, filed Dec. 19, 2022, which claims priority to Chinese patent application No. 2022103316867 filed Mar. 31, 2022. The contents of these applications are incorporated herein by reference in their entirety for all purposes.

TECHNICAL FIELD

The disclosure relates to the technical field of lifting transport apparatus, and in particular to an anti-fall mechanism and a lifting transport apparatus.

BACKGROUND

Currently, lifting transport equipment in the market, such as hoists, lifts, stackers and elevators, are generally operated by means of synchronous belts, chains, electric hoists, and other mechanisms to achieve lifting. However, during transportation, due to the damage or aging of the equipment, and in some cases with a very high lifting height, unintended events such as material container falling can easily occur from a broken synchronous belt or chain or electrical runaway. Such events may result in material container damage and even pose a major threat to the safety of workers.

SUMMARY

The disclosure aims to solve at least one of the technical problems in the existing technology by providing an anti-fall mechanism.

The disclosure also provides a lifting transport apparatus including the anti-fall mechanism according to an embodiment of a first aspect.

According to an embodiment of the first aspect of the disclosure, there is provided an anti-fall mechanism applied to a lifting transport apparatus, the anti-fall mechanism including: a conveying platform, a linkage, an elastic mechanism, a limit switch and a self-locking mechanism. The conveying platform is installed on a lifting belt of the lifting transport apparatus. The linkage includes a first coupler, a second coupler and two rockers, where two ends of the first coupler are rotationally coupled to two ends of the second coupler, respectively, via the two rockers. The elastic mechanism is arranged between the conveying platform and the lifting belt, where one end of the elastic mechanism is connected to the first coupler, and the other end of the elastic mechanism is pressed by the lifting belt. The limit switch is arranged on the second coupler. The self-locking mechanism is arranged on the conveying platform and capable of locking and securing the conveying platform to a frame of the lifting transport apparatus. When the lifting belt is in operation, the elastic mechanism is compressed, the limit switch extends, and the self-locking mechanism is in an unlocked state. When the lifting belt breaks, the elastic mechanism is reset to drive the first coupler to move, and the first coupler in turn drives the second coupler to retract the limit switch, such that the self-locking mechanism locks and secures the conveying platform.

Beneficial effects: According to the anti-fall mechanism, when the lifting belt functions properly, the elastic mechanism is pressed by the lifting belt and the self-locking mechanism is in the unlocked state. When the lifting belt breaks, the pressure on the elastic mechanism disappears, and the elastic mechanism is reset under the action of elastic force, thus driving the first coupler to move, and the first coupler in turn drives the second coupler to move through the rocker, thereby causing the limit switch to retract, so that the self-locking mechanism locks and secures the conveying platform to the frame of the lifting transport apparatus, thus preventing the conveying platform from falling and being damaged, and improving safety.

In the anti-fall mechanism according to an embodiment of the first aspect of the disclosure, the elastic mechanism includes at least one connecting rod, a top plate and a first spring, the connecting rod passes through two ends of the conveying platform, one end of the connecting rod is connected to the first coupler, the first spring is installed on the connecting rod and located between the top plate and an end face of the conveying platform, one side of the top plate is installed at the other end of the connecting rod, and the lifting belt presses the other side of the top plate.

In the anti-fall mechanism according to an embodiment of the first aspect of the disclosure, the self-locking mechanism includes a first inclined block, a second inclined block and a driving assembly, an actuating end of the driving assembly is connected to the first inclined block, the second inclined block is arranged such that an inclined surface of the second inclined block is opposite an inclined surface of the first inclined block, and the driving assembly is configured to drive the first inclined block to slide relative to the second inclined block.

In the anti-fall mechanism according to an embodiment of the first aspect of the disclosure, the self-locking mechanism further includes a fixed seat, the driving assembly includes a second spring, the fixed seat is installed on the conveying platform, the fixed seat is provided with a vertical first through hole which is configured as extending through a top end of the fixed seat, the second spring is located in the first through hole, and two ends of the second spring are respectively in contact with a bottom end of the first inclined block and a bottom wall of the first through hole.

In the anti-fall mechanism according to an embodiment of the first aspect of the disclosure, the driving assembly further includes a resisting column, the fixed seat is provided with the first through hole and a second through hole which are coaxially and vertically arranged, a diameter of the first through hole is larger than a diameter of the second through hole, the second through hole is configured as extending through a bottom end of the fixed seat, the resisting column passes through the first through hole and the second through hole, the second spring is installed on the resisting column, and the first inclined block abuts against the resisting column.

In the anti-fall mechanism according to an embodiment of the first aspect of the disclosure, the resisting column includes a first column segment and a second column segment, a diameter of the first column segment is larger than a diameter of the second column segment, a top end of the second spring is in contact with a bottom end of the first column segment, and a top end of the first column segment abuts against the first inclined block.

In the anti-fall mechanism according to an embodiment of the first aspect of the disclosure, the self-locking mechanism further includes a limiting block for preventing the resisting column from moving upward, and the limiting block is installed on the resisting column and located below the fixed seat.

In the anti-fall mechanism according to an embodiment of the first aspect of the disclosure, the self-locking mechanism further includes a slider and a slide groove, the slider is slidable along the slide groove, the slide groove is oriented parallel to the inclined surface of the first inclined block, and the slider and the slide groove are respectively arranged on top surfaces of the first inclined block and the second inclined block.

According to an embodiment of a second aspect of the disclosure, there is provided a lifting transport apparatus, including: a frame, a pulley assembly, a power member and the anti-fall mechanism according to any embodiment of the first aspect of the disclosure. The pulley assembly includes a lifting belt, a driving pulley and a driven pulley, the driving pulley and the driven pulley are installed through two ends of the frame, and the lifting belt is wound around the driving pulley and the driven pulley. The power member is installed on the frame and has an output end connected to the driving pulley. The anti-fall mechanism is installed on the lifting belt.

Beneficial effects: According to the lifting transport apparatus, by utilizing the anti-fall mechanism according to any embodiment of the first aspect, the conveying platform can be locked and secured when the lifting belt breaks, thereby preventing falling, and improving the safety performance of the lifting transport apparatus.

In the lifting transport apparatus according to an embodiment of the second aspect of the disclosure, the lifting transport apparatus further includes a guide structure, which is arranged on the conveying platform and located on two sides of the frame.

BRIEF DESCRIPTION OF DRAWINGS

The disclosure will be further explained hereinafter with reference to the accompanying drawings and embodiments.

Anti-fall mechanism 10;
Conveying platform 100;
Linkage 200: first coupler 210, second coupler 220, first rocker 231, second rocker 232, and intermediate coupler 240;
Elastic mechanism 300: connecting rod 310, top plate 320, and first spring 330;
Limit Switch 400;
Self-locking mechanism 500: first inclined block 510, anti-slip structure 511, second inclined block 520, fixed seat 530, resisting column 541, second spring 542, slider 550, and slide groove 560;
Frame 20: base mount 21, top mount 22, and guide rail portion 23;
Pulley assembly 30: lifting belt 31, driving pulley 32, and driven pulley 33;
Power member 40; and
Guide structure 50.

DETAILED DESCRIPTION

This section will describe specific embodiments of the disclosure in detail, and preferred embodiments of the disclosure are shown in the accompanying drawings. The accompanying drawings are used to supplement the text description of the specification with graphic illustrations, so that each technical feature and the overall technical scheme of the disclosure can be intuitively and vividly understood. However, the accompanying drawings should not be construed as limiting the scope of protection of the disclosure.

In the description of the disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the disclosure and simplify the description only, rather than indicating or implying that the apparatus or element referred to must have a specific orientation or be constructed and operated in a specific orientation, and therefore cannot be construed as limiting the disclosure.

In the description of the disclosure, the meaning of "several" is one or more: the meaning of "a plurality of" is two or more: "greater than", "less than", "more than", etc. are to be construed as excluding the number; and "above", "below", "within", etc. are to be construed as including the number. If "first" and "second", etc. are referred to, it is only for the purpose of distinguishing technical features, and shall not be construed as indicating or implying relative importance or implying the number of the indicated technical features or implying the sequence of the indicated technical features.

In the description of the disclosure, unless otherwise explicitly defined, the terms such as "arrange", "install", and "connect" should be construed in a broad sense, and those of ordinary skills in the art can determine the specific meanings of the above terms in the disclosure in a rational way in conjunction with the specific contents of the technical schemes. Referring to FIGS. 1-4, an anti-fall mechanism applied to a lifting transport apparatus includes: a conveying platform 100, a linkage 200, an elastic mechanism 300, a limit switch 400 and a self-locking mechanism 500.

The conveying platform 100 is installed on a lifting belt of the lifting transport apparatus. The linkage 200 includes a first coupler 210, a second coupler 220 and two rockers, where two ends of the first coupler 210 are rotationally coupled to two ends of the second coupler 220, respectively, via the two rockers. The elastic mechanism 300 is arranged between the conveying platform 100 and the lifting belt, where one end of the elastic mechanism 300 is connected to the first coupler 210, and the other end of the elastic mechanism 300 is pressed by the lifting belt. The limit switch 400 is arranged on the second coupler 220. The self-locking mechanism 500 is arranged on the conveying platform 100, and the self-locking mechanism 500 is capable of locking and securing the conveying platform 100 to a frame of the lifting transport apparatus.

Figure 3:
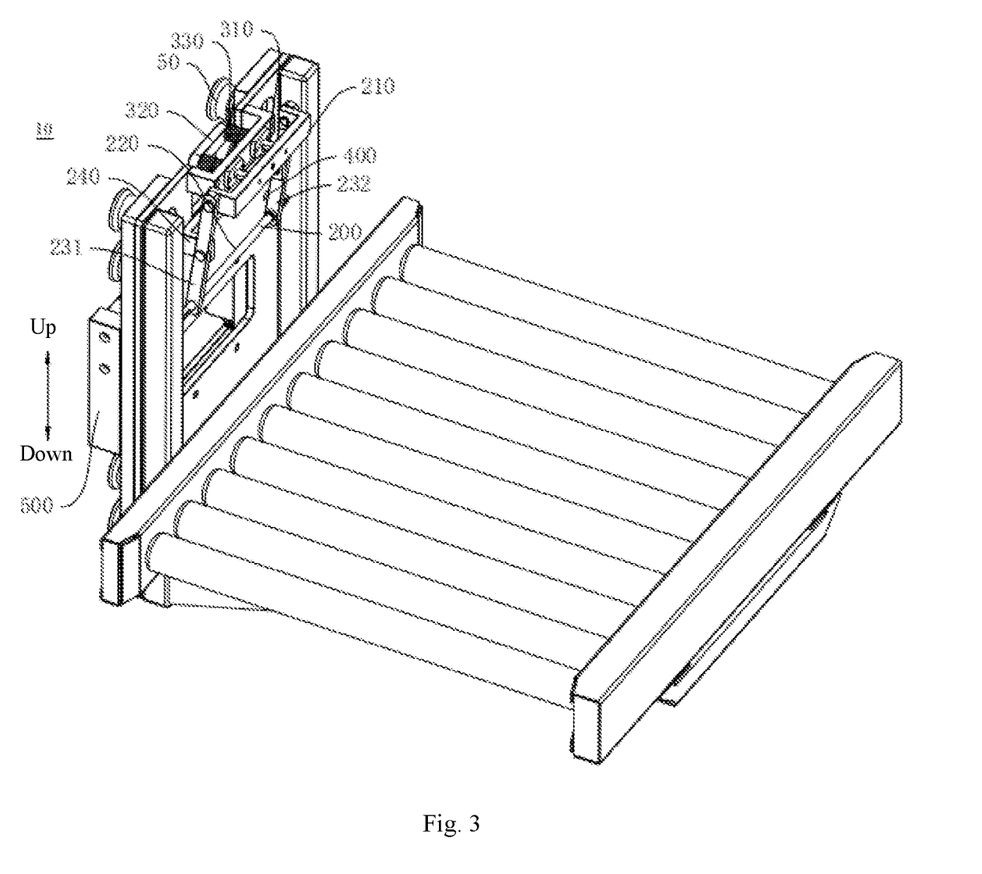
FIG. 3 is a schematic diagram of an anti-fall mechanism viewed from a side where a linkage is located according to an embodiment of the disclosure.
Figure 4:
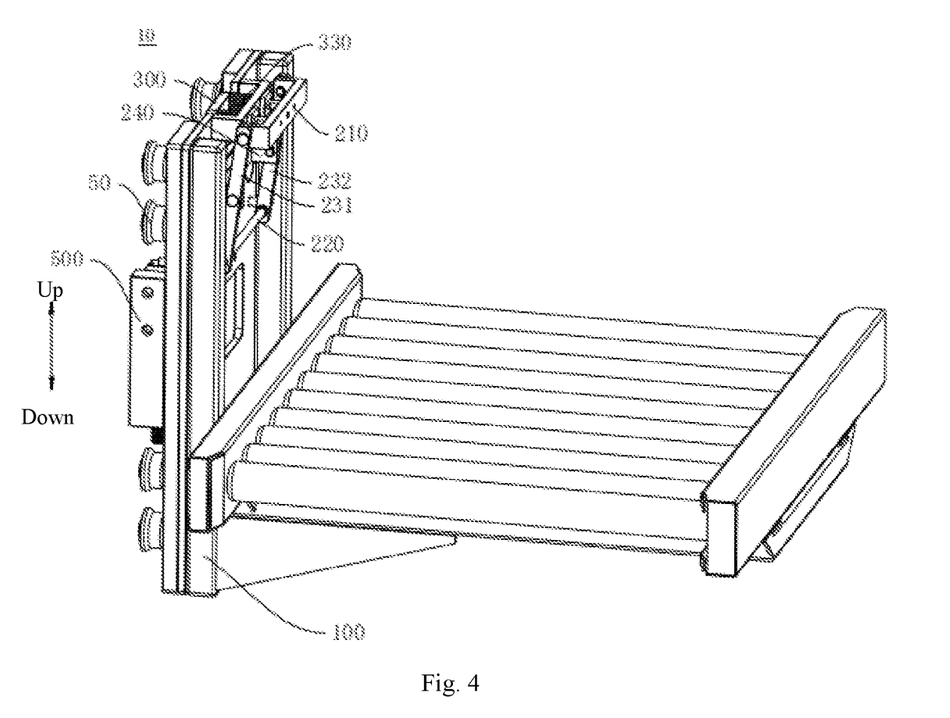
FIG. 4 is a side view of an anti-fall mechanism according to an embodiment of the disclosure.

Referring to FIGS. 3 and 4, specifically, the rockers include a first rocker 231 and a second rocker 232. The first coupler 210, the second coupler 220, the first rocker 231 and the second rocker 232 form a parallelogram structure, with the first coupler 210 and the second coupler 220 being arranged in parallel, and the first rocker 231 and the second rocker 232 being arranged in parallel. Two ends of the first rocker 231 are rotationally coupled to the first coupler 210 and the second coupler 220, respectively, by a pivot pin, and two ends of the second rocker 232 are rotationally coupled to the first coupler 210 and the second coupler, respectively, by a pivot pin.

The first coupler 210 is arranged along a lengthwise direction of the frame, and the elastic mechanism 300 can drive the first coupler 210 to move horizontally along a widthwise direction of the frame. The movement of the first coupler 210 drives two ends of the second coupler 220 to move in an opposite direction relative to the first coupler 210 through the first rocker 231 and the second rocker 232, thereby finally realizing the control of the limit switch 400.

When the lifting belt is in operation, the elastic mechanism 300 is in a compressed state, the limit switch 400 extends out to block the self-locking mechanism 500, and the self-locking mechanism 500 is in an unlocked state. When the lifting belt breaks, the elastic mechanism 300 is reset to drive the first coupler 210 to move, the first coupler 210 in turn drives the second coupler 220 to retract the limit switch 400, such that the self-locking mechanism 500 locks and secures the conveying platform 100, thereby preventing the conveying platform 100 from falling, and improving safety.

The conveying platform 100 includes a vertical part and a horizontal part, which are arranged perpendicular to each other. The vertical part is fixed relative to the lifting belt, and the horizontal part is used for placing a material container. Of course, the horizontal part can also be provided with horizontally arranged electric conveying rollers.

Referring to FIGS. 3 and 4, the elastic mechanism 300 includes at least one connecting rod 310, a top plate 320 and a first spring 330. The self-locking mechanism 500 and the linkage 200 are respectively located on two opposite sides of the conveying platform 100. The connecting rod 310 passes through two ends of the conveying platform 100. One end of the connecting rod 310 is connected to the first coupler 210. The first spring 330 is installed on the connecting rod 310 and the first spring 330 is located between the top plate 320 and an end face of the conveying platform 100. One side of the top plate 320 is installed at the other end of the connecting rod 310. The lifting belt presses the other side of the top plate 320.

A recess is provided at the top of the conveying platform 100, and the opening side of the recess is arranged to face toward the lifting belt. The elastic mechanism 300 can be installed in the recess, and the spring is installed between the top plate 320 and a bottom plate of the recess, such that the spring, when being reset, pushes the top plate 320, thereby causing the top plate 320 to drive the first coupler 210 to move. Since the lifting belt needs to resist the elastic mechanism 300 here, and the lifting belt needs to be able to drive upward, arrangement of the recess for installing the elastic mechanism 300 allows the lifting belt to pass through properly and the condition that the lifting belt presses against the elastic mechanism 300 to be met as well.

Specifically, the number of the connecting rods 310 is two. The connecting rods 310 pass through a bottom plate of the recess and are connected to the first coupler 210. The first spring 330 is provided around a part, inside the recess, of each of the connecting rods 310. The top plate 320 is installed at top ends of the two connecting rods 310, which can not only resist the first spring 330, but also facilitate the lifting belt pressing against the elastic mechanism 300.

The first coupler 210 is similar in shape to the recess, and the first coupler 210 includes a main plate and side plates located on two sides of the main plate. The side plates are rotationally coupled to the first rocker 231 and the second rocker 232, and the main plate is connected to the connecting rods 310.

Referring to FIGS. 3 and 4, the linkage 200 further includes an intermediate coupler 240. The intermediate coupler 240 is disposed between the first coupler 210 and the second coupler 220, two ends of the intermediate coupler 240 being rotationally coupled to the two rockers, respectively. The intermediate coupler 240 is recessed. The intermediate coupler 240 can enhance the stability of the linkage 200.

Figure 1:
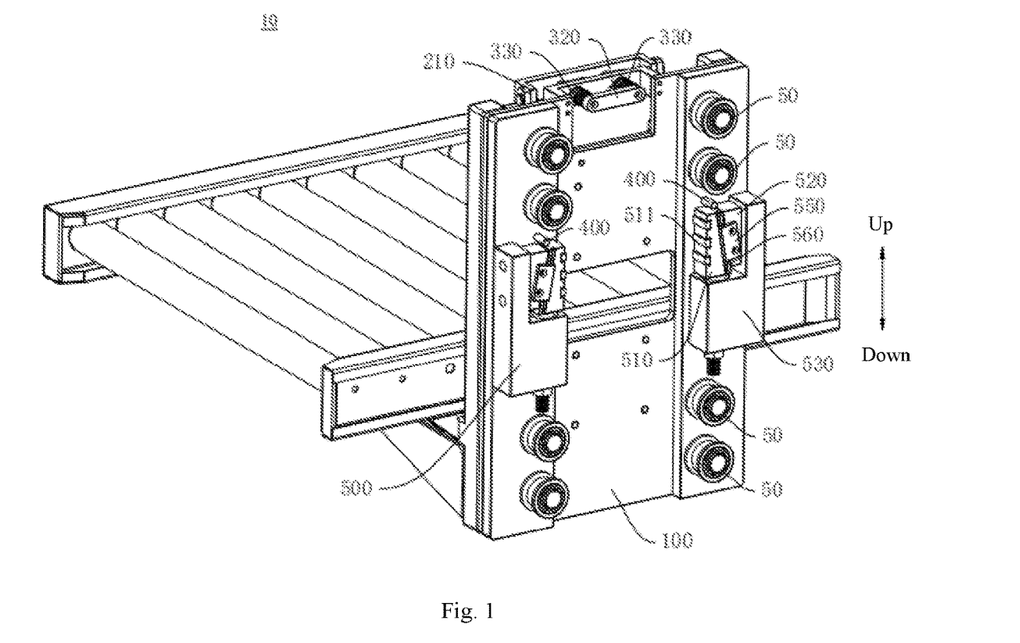
FIG. 1 is a schematic diagram of an anti-fall mechanism viewed from a side where a self-locking mechanism is located according to an embodiment of the disclosure.
Figure 2:
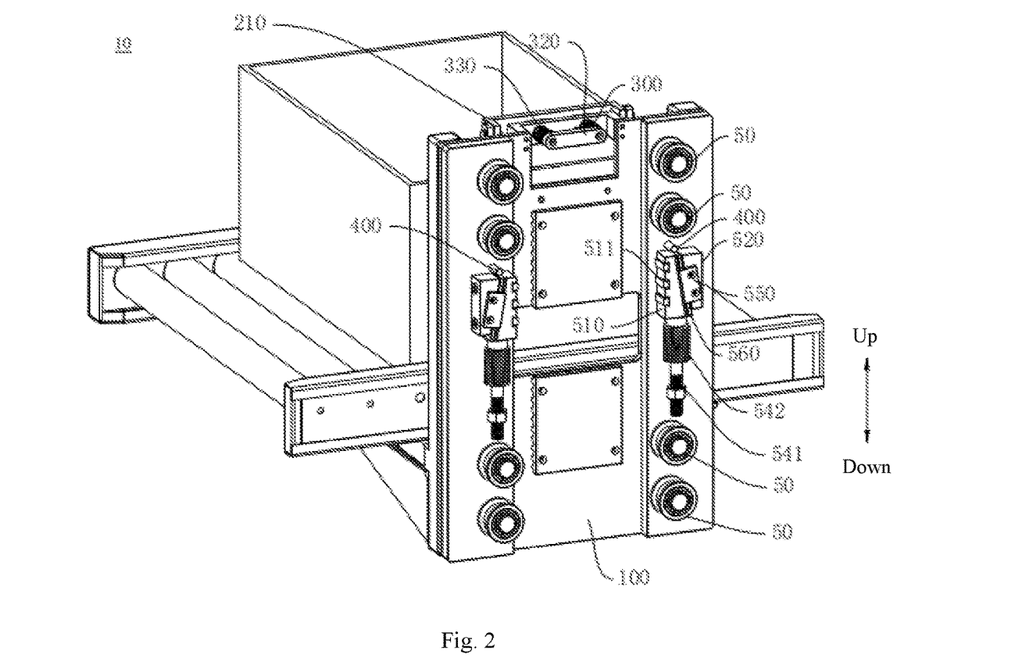
FIG. 2 is a schematic diagram of the interior of a self-locking mechanism of an anti-fall mechanism according to an embodiment of the disclosure.

Referring to FIGS. 1 and 2, the self-locking mechanism 500 includes a first inclined block 510, a second inclined block 520 and a driving assembly. An actuating end of the driving assembly is connected to the first inclined block 510. The second inclined block 520 is arranged with an inclined surface thereof opposite an inclined surface of the first inclined block 510. The driving assembly is configured to drive the first inclined block 510 to slide relative to the second inclined block 520. The second inclined block 520 may be fixedly arranged on the conveying platform. The second inclined block 520 and the first inclined block 510 together form a square block. The length of a bottom edge of the first inclined block 510 is greater than or equal to the distance between the first inclined block 510 and the frame, thereby ensuring that the first inclined block 510 can be locked to the frame.

Referring to FIGS. 1 and 2, the self-locking mechanism further includes a fixed seat 530, the driving assembly includes a second spring 542, the fixed seat 530 is installed on the conveying platform 100, the fixed seat 530 is provided with a vertical first through hole which is configured as extending through a top end of the fixed seat 530, the second spring 542 is located in the first through hole, and two ends of the second spring 542 are respectively in contact with a bottom end of the first inclined block 510 and a surface of a bottom wall of the first through hole. Specifically, the first through hole may be a square hole or a circular hole extending through the top of the fixed seat 530. The depth of the first through hole is less than the height of the fixed seat 530, such that the bottom surface of the second spring 542 can abut against the surface of the bottom wall of the first through hole. The top end of the second spring 542 is in contact with the bottom surface of the first inclined block 510, such that the fixed seat 530, the second spring 542 and the first inclined block 510 form an elastic system, and the first inclined block 510 can be moved by expansion and contraction of the second spring 542. Moreover, in an initial state, the second spring 542 is in a compressed state and is in an energy storage state due to the action of the limit switch 400. When the limit switch is pulled out, the second spring 542 is reset to drive the first inclined block 510 to move upward, thereby realizing the locking of the first inclined block 510 onto the frame. In addition, this scheme uses the second spring 542 as a power member directly, so that the structure is simple and the cost is low.

It can be readily understood that the length of the second spring 542 in the initial state is larger than the depth of the first through hole, and the second spring 542 can only be compressed to a state where it is flush with the depth of the first through hole, so the difference between the length of the second spring in the initial state and the depth of the first through hole is approximately the distance by which the first inclined block 510 moves, and the specific parameters of the second spring 542 can be selected according to actual needs.

In some embodiments, referring to FIGS. 1 and 2, the driving assembly includes a resisting column 541 and the second spring 542. The fixed seat 530 is provided with the first through hole and the second through hole, which are coaxially and vertically arranged. The diameter of the first through hole is larger than the diameter of the second through hole. The first through hole is located on the side close to the first inclined block 510, that is, the first through hole extends through the top end of the fixed seat 530. The second through hole is configured as extending through the bottom end of the fixed seat 530. The first through hole and the second through hole together form a T-shaped through hole with a large top and a small bottom. On the one hand, it allows the bottom of the second spring 542 to abut against. On the other hand, it allows the resisting column 541 to pass through the first through hole and the second through hole, so that the resisting column 541 can move vertically along the axis of the first through hole and the second through hole. The second spring 542 is located between the bottom end of the first inclined block 510 and the surface of the bottom wall of the first through hole. The top end of the second spring 542 abuts against the bottom of the first inclined block 510. The second spring 542 is mounted on the resisting column 541, and the first inclined block 510 abuts against the resisting column 541. The first inclined block 510 and the resisting column 541 can be clamped and fixed to each other. The top end of the second spring 542 is fixed by the bottom surface of the first inclined block 510, and the bottom end of the second spring 542 is in contact with the surface of the bottom wall of the first through hole, so that the second spring 542 can be compressed by the first inclined block 510, however, in which case the length of the second spring 542 in the initial state has to be designed to be larger than the length of the first through hole.

When the lifting belt functions properly, the second spring 542 is in a compressed state. When the lifting belt breaks, the linkage 200 drives the limit switch 400 to retract, so that the top of the first inclined block 510 is set free from the block of the limit switch 400. As the second spring 542 is in the compressed state, the first inclined block 510 has an upward movement tendency, which enables the first inclined block 510 to achieve self-locking.

Referring to FIG. 1, the fixed seat 530 includes a bottom part and a side part which are arranged in an L shape. The bottom part is provided with the first through hole and the second through hole which are arranged coaxially, and the resisting column 541 passes through the first through hole and the second through hole. The shapes of the first through hole and the second through hole may be designed according to actual needs.

In some embodiments, the resisting column 541 includes a first column segment and a second column segment, the first column segment having a diameter larger than that of the second column segment. The first column segment is positioned above the second column segment. The second spring 542 is mounted on the second column segment, and the top end of the second spring 542 is in contact with a bottom end of the first column segment. A top end of the first column segment abuts against the first inclined block 510. The bottom end of the second spring 542 is in contact with the surface of the bottom wall of the first through hole. In this case, the two ends of the second spring 542 are limited by the bottom end of the first column segment and the surface of the bottom wall of the first through hole, and the length of the second spring 542 in the initial state is not necessary to be designed to be larger than the length of the first through hole. The first column segment is similar to an end cap such that the second spring 542 is located completely within the first through hole, ensuring the performance of the second spring. Of course, the first column segment may also be detachably installed at the top end of the second column segment.

In some embodiments, the self-locking mechanism further includes a limiting block mounted on the resisting column 541. The limiting block is located below the fixed seat 530 and can prevent the resisting column 541 from moving upward. Specifically, the shape of the limiting block may be circular or square, and the limiting block may be detachably mounted on the resisting column 541. The maximum length of the entire surface of the limiting block has to be larger than the diameter of the second through hole so that the limiting block cannot pass through the second through hole and the resisting column 541 is restricted from moving upward.

When the lifting belt functions properly, there is a certain distance d between the limiting block and the bottom of the fixed seat 530. When the lifting belt breaks, the resisting column 541 moves upward to drive the limiting block to move upward. The moving distance of the resisting column is the distance d between the limiting block and the bottom of the fixed seat 530 in the initial state. In order to ensure that the anti-fall mechanism can be locked, the distance d between the limiting block and the bottom of the fixed seat 530 in the initial state needs to be set as the moving distance of the first inclined block 510.

The limiting block can limit the movement of the resisting column 541. By setting the distance between the limiting block and the bottom of the fixed seat 530 in the initial state, the moving distance of the first inclined block 510 is ensured, so that the locking effect of the anti-fall mechanism is ensured, the wear of the frame caused by the moving distance of the first inclined block 510 being too long is also prevented, and it is also more convenient for the limiting block to control the moving distance of the first inclined block 510.

The limiting block is movable along the second column segment of the resisting column so that the upward moving distance of the first slant block 510 can be adjusted. The limiting block can be implemented by a nut, which is simple in structure and convenient to install.

Specifically, in a specific embodiment, the resisting column 541 includes a threaded section, an intermediate plain shaft section and a head section, and the limiting member is a nut. The head section abuts against the first inclined block 510, the head section having a diameter larger than that of the second spring 542. The second spring 542 is mounted on the intermediate plain shaft section. The two ends of the second spring 542 are respectively in contact with the head section and the bottom wall of the first through hole. The head section abuts against the first inclined block 510. The threaded section is located at the bottom end of the intermediate plain shaft section and is provided with an external thread. The threaded section extends out of the second through hole, and the nut is threaded onto the threaded section. The resisting column 541 can compress the second spring 542, and then the nut can be tightened upward to fix the resisting column 541, thereby facilitating the installation of the first inclined block 510 and the second inclined block 520. The nut can also function as a limiting member to adjust the upward moving distance of the first inclined block 510, thereby adjusting the locking force of the first inclined block 510 against the frame.

This anti-fall mechanism achieves the locking of the first inclined block 510 by cooperation between the resisting column 541 and the second spring 542, and since the spring responds sensitively, the self-locking can be achieved promptly.

It can be readily understood that the driving assembly may also be a lifting cylinder, a linear motor, etc. The switch of the driving assembly is set as a limit switch 400, and the limit switch 400 is driven by the linkage 200 to make the lifting cylinder and the linear motor work, thereby driving the first inclined block 510 to slide relative to the second inclined block 520 and finally realizing the locking.

The limit switch 400 is a limit lever, one end of which is connected to the second coupler 220, and the other end of which extends through the conveying platform 100 and prevents the first inclined block 510 from moving upward. The conveying platform 100 is provided with a through hole, and the through hole is located on an upper part of the first inclined block 510. In the initial state, one end of the limit lever extends through the through hole and blocks the upward movement of the first inclined block 510, and the other end of the limit lever is connected to the second coupler 220, so that the limit lever extends out of the through hole to unlock and retracts from the through hole to self-lock.

In some embodiments, an anti-slip structure 511 is provided on one side, close to the frame, of the first inclined block 510. Specifically, the anti-slip structure 511 can ensure a more stable locking effect between the first inclined block 510 and the frame and prevent slipping between the first inclined block 510 and the frame which may cause the anti-fall protection to fail.

The anti-slip structure 511 may specifically be implemented by spring rubber. The anti-slip structure 511 may be implemented as detachable spring rubber blocks which are arranged at vertical intervals on the side of the first inclined block 510 close to the frame. By providing multiple spring rubber blocks, the anti-slip structure 511 can achieve a better effect.

Referring to FIG. 1, it can be readily understood that the self-locking mechanism further includes a slider 550 and a slide groove 560, the slider 550 can slide along the slide groove 560, the slide groove 560 is oriented parallel to the inclined surface of the first inclined block 510, and the slider 550 and the slide groove 560 are respectively arranged on top surfaces of the first inclined block 510 and the second inclined block 520. By the arrangement of the slider 550 and the slide groove 560, the first inclined block 510 can be more stable during motion and locking. Specifically, the slider 550 is a bent plate, including a first plate and a second plate which are perpendicular to each other. The first plate is fixed to the second inclined block 520 by screws, and the slide groove 560 is arranged on the first inclined block 510. The second plate matches the slide groove 560 such that the second plate can slide in the slide groove 560. Of course, alternatively, the slide groove 560 may be provided on the second inclined block 520 and the slider 550 may be mounted on the first inclined block 510.

Figure 5:
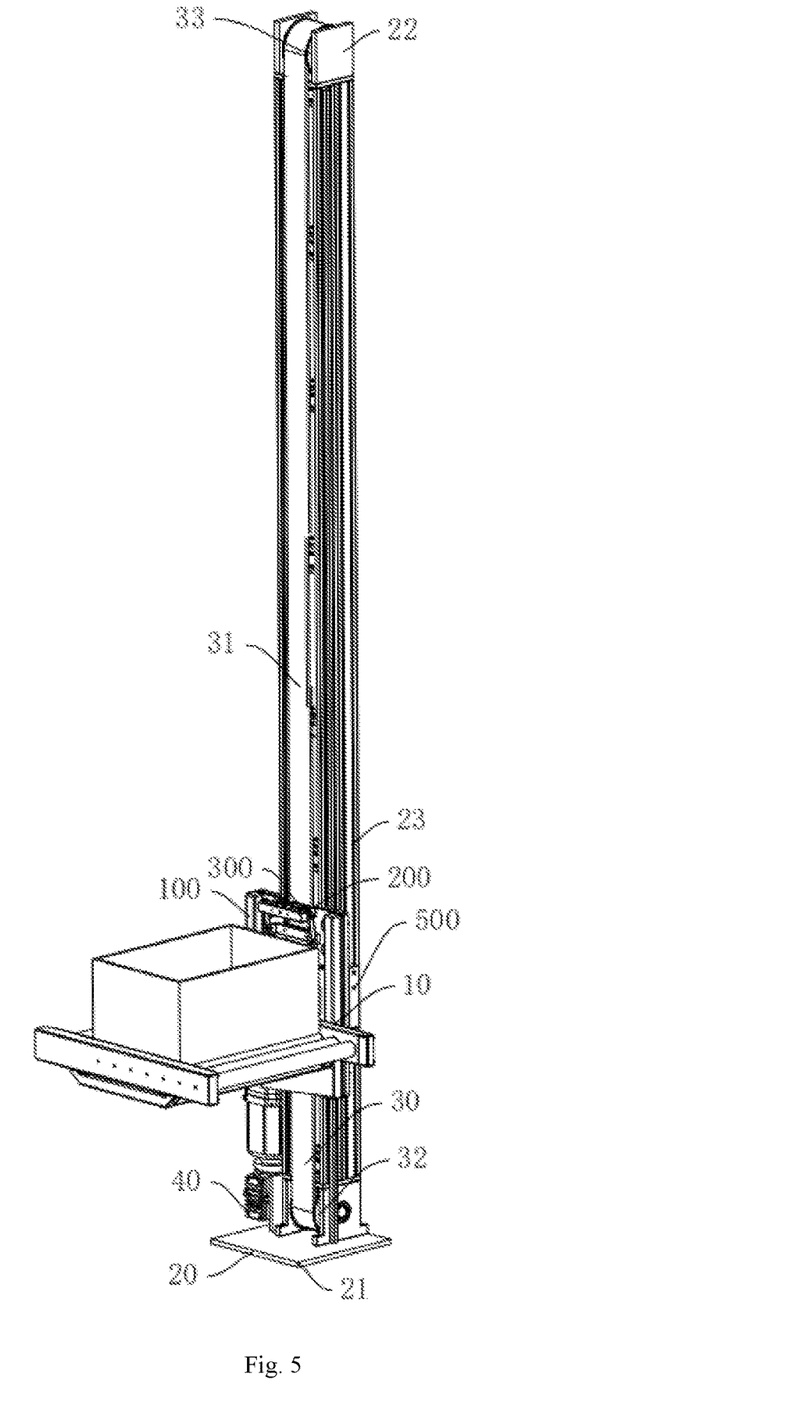
FIG. 5 is a schematic diagram of a lifting transport apparatus according to an embodiment of the disclosure.
Figure 6:
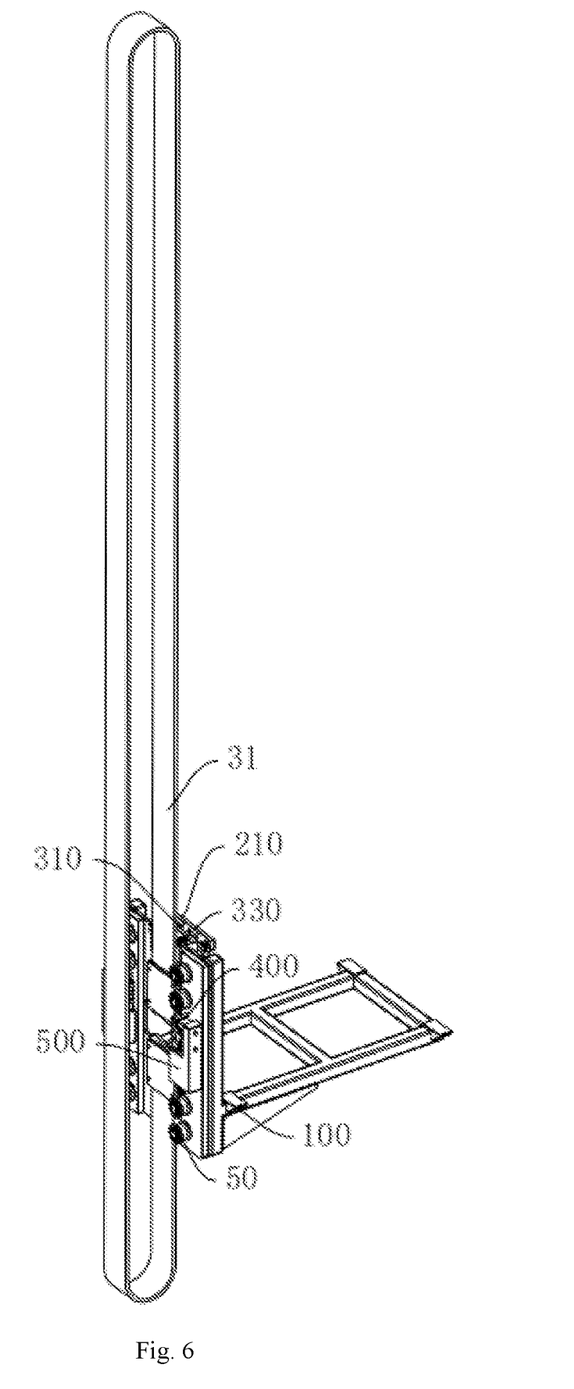
FIG. 6 is a schematic diagram of a lifting transport apparatus with a frame removed according to an embodiment of the disclosure.

Referring to FIGS. 5 and 6, a lifting transport apparatus includes: a frame 20, a pulley assembly 30, a power member 40 and an anti-fall mechanism 10 according to any embodiment of the first aspect of the disclosure. Here, the pulley assembly 30 includes a lifting belt 31, a driving pulley 32 and a driven pulley 33, the driving pulley 32 and the driven pulley 33 being installed through two ends of the frame 20, and the lifting belt 31 being wound around the driving pulley 32 and the driven pulley 33. The power member 40 is installed on the frame 20 and the power member 40 has an output end connected to the driving pulley 32. The anti-fall mechanism 10 is installed on the lifting belt 31.

Specifically, the lifting transport apparatus may be a hoist, an elevator, a stacker, etc. In this embodiment, the lifting transport apparatus is a hoist.

The frame 20 includes a base mount 21, a top mount 22, and a guide rail portion 23, the guide rail portion 23 being located between the base mount 21 and the top mount 22. The driving pulley 32 is mounted on the base mount 21, the driven pulley 33 is mounted on the top mount 22, and the power member 40 is mounted on the base mount 21. The power member 40 and the driving pulley 32 can be connected through a reducer and a rotating shaft. The guide rail portion 23 is configured to extend in the vertical height direction, the conveying platform 100 is driven up and down by the lifting belt 31, and the self-locking mechanism 500 is provided on two sides of the guide rail portion 23. Once the lifting belt 31 breaks, the self-locking mechanism 500 will be activated so that the first inclined block 510 slides upward until an inner side thereof comes into contact with and gets locked to the guide rail portion 23, thereby securing the conveying platform 100 to the guide rail portion 23 and preventing the conveying platform 100 from falling after the lifting belt 31 breaks, which improves the safety of the hoist.

Specifically, the power member 40 is an electric motor, the lifting belt 31 is a synchronous belt, and the driving pulley 32 and the driven pulley 33 are synchronous pulleys. The conveying platform 100 is fixed to the synchronous belt, and the conveying platform 100 and the synchronous belt are fixed by a fixing plate. One side of the fixing plate is provided with teeth to be engaged with the synchronous belt. The fixing plate is fixed to the conveying platform 100 by screws. The synchronous belt is sandwiched between the fixing plate and the conveying platform 100, and the synchronous belt is engaged with the fixing plate.

Referring to FIG. 5, in some embodiments, the hoist further includes a guide structure 50. The guide structure 50 is arranged on the conveying platform 100, and the guide structure 50 is located on two sides of the frame 20. It can be readily understood that the side of the conveying platform 100 fixed to the synchronous belt by the fixing plate is flanked with the guide structure 50. The guide structure 50 can guide the guide rail portion 23 of the frame 20 and prevent the conveying platform 100 from shaking during lifting and lowering. The guide structure 50 may be specifically implemented as a guide roller, an elastic plate, a cylindrical roller, etc.

In this embodiment, the guide structure 50 is implemented as guide rollers. The guide rollers can be detachably installed on the conveying platform through a guide shaft. The friction between the guide roller and the frame 20 is rolling friction, which causes minimal wear and tear, and the installation and detachment of the guide rollers are also convenient. The specific number of guide rollers can be set according to actual needs, which is not limited here. Four pairs of guide rollers are shown in the figure.

When the hoist functions properly, the actuating end of the power member 40 drives the driving pulley 32 to rotate, thereby driving the lifting belt 31 to move, and the lifting belt 31 drives the conveying platform to move. At this time, the lifting belt 31 is in a tensioned state and presses against the elastic mechanism 300. When the lifting belt 31 is broken or damaged, the lifting belt 31 is no longer tensioned, the pressure on the elastic mechanism 300 disappears, and the elastic mechanism 300 is to be reset, thereby driving the first coupler 210 to move transversely. The elastic mechanism 300, as a sensing part to sense the state of the lifting belt 31, can respond quickly and react accordingly. While the first coupler 210 moves transversely, the first rocker 231 and the second rocker 232 connected to the first coupler are driven to swing, thereby driving the second coupler 220 to move transversely in an opposite direction relative to the movement of the first coupler 210, and finally pulling out the limit lever. After the limit lever is pulled out, the top of the first inclined block 510 is free from blockage, and the second spring changes from the compressed state to its original state, thus pushing the first inclined block 510 upward, so that the first inclined block 510 can finally lock the conveying platform 100, realizing the anti-fall function and improving the safety of the hoist.

Although the embodiments of the disclosure have been described in detail above with reference to the accompanying drawings, the disclosure is not limited to the above embodiments, and various changes may be made within the knowledge of those of ordinary skills in the art without departing from the purpose of the disclosure.

What is claimed is:

1. An anti-fall mechanism, applied to a lifting transport apparatus, the anti-fall mechanism comprising:
    a conveying platform, which is installed on a lifting belt of the lifting transport apparatus;
    a linkage, which comprises a first coupler, a second coupler and two rockers, wherein two ends of the first coupler are rotationally coupled to two ends of the second coupler, respectively, via the two rockers;
    an elastic mechanism, which is arranged between the conveying platform and the lifting belt, wherein one end of the elastic mechanism is connected to the first coupler, and the other end of the elastic mechanism is pressed by the lifting belt;
    a limit switch, which is arranged on the second coupler;
    a self-locking mechanism, which is arranged on the conveying platform and capable of locking and securing the conveying platform to a frame of the lifting transport apparatus;
    wherein when the lifting belt is in operation, the elastic mechanism is compressed, the limit switch extends, and the self-locking mechanism is in an unlocked state, and when the lifting belt breaks, the elastic mechanism is reset to drive the first coupler to move, which in turn drives the second coupler to retract the limit switch, such that the self-locking mechanism locks and secures the conveying platform.

2. The anti-fall mechanism of claim 1, wherein the elastic mechanism comprises at least one connecting rod, a top plate and a first spring, the connecting rod passes through two ends of the conveying platform, one end of the connecting rod is connected to the first coupler, the first spring is installed on the connecting rod and located between the top plate and an end face of the conveying platform, one side of the top plate is installed at the other end of the connecting rod, and the lifting belt presses the other side of the top plate.

3. The anti-fall mechanism of claim 1, wherein the self-locking mechanism comprises a first inclined block, a second inclined block and a driving assembly, an actuating end of the driving assembly is connected to the first inclined block, the second inclined block is arranged such that an inclined surface of the second inclined block is opposite an inclined surface of the first inclined block, and the driving assembly is configured to drive the first inclined block to slide relative to the second inclined block.

4. The anti-fall mechanism of claim 3, wherein the self-locking mechanism further comprises a fixed seat, the driving assembly comprises a second spring, the fixed seat is installed on the conveying platform, the fixed seat is provided with a vertical first through hole which is configured as extending through a top end of the fixed seat, the second spring is located in the first through hole, and two ends of the second spring are respectively in contact with a bottom end of the first inclined block and a bottom wall of the first through hole.

5. The anti-fall mechanism of claim 4, wherein the driving assembly further comprises a resisting column, the fixed seat is provided with the first through hole and a second through hole which are coaxially and vertically arranged, a diameter of the first through hole is larger than a diameter of the second through hole, the second through hole is configured as extending through a bottom end of the fixed seat, the resisting column passes through the first through hole and the second through hole, the second spring is installed on the resisting column, and the first inclined block abuts against the resisting column.

6. The anti-fall mechanism of claim 5, wherein the resisting column comprises a first column segment and a second column segment, a diameter of the first column segment is larger than a diameter of the second column segment, a top end of the second spring is in contact with a bottom end of the first column segment, and a top end of the first column segment abuts against the first inclined block.

7. The anti-fall mechanism of claim 5, wherein the self-locking mechanism further comprises a limiting block for preventing the resisting column from moving upward, and the limiting block is installed on the resisting column and located below the fixed seat.

8. The anti-fall mechanism of claim 3, wherein the self-locking mechanism further comprises a slider and a slide groove, the slider is slidable along the slide groove, the slide groove is oriented parallel to the inclined surface of the first inclined block, and the slider and the slide groove are respectively arranged on top surfaces of the first inclined block and the second inclined block.

9. A lifting transport apparatus, comprising:
    a frame;
    a pulley assembly, which comprises a lifting belt, a driving pulley and a driven pulley, the driving pulley and the driven pulley being installed through two ends of the frame, and the lifting belt being wound around the driving pulley and the driven pulley;
    a power member, which is installed on the frame and has an output end connected to the driving pulley; and
    the anti-fall mechanism of claim 1, which is installed on the lifting belt.

10. The lifting transport apparatus of claim 9, further comprising a guide structure, which is arranged on the conveying platform and located on two sides of the frame.

11. The anti-fall mechanism of claim 9, wherein the elastic mechanism comprises at least one connecting rod, a top plate and a first spring, the connecting rod passes through two ends of the conveying platform, one end of the connecting rod is connected to the first coupler, the first spring is installed on the connecting rod and located between the top plate and an end face of the conveying platform, one side of the top plate is installed at the other end of the connecting rod, and the lifting belt presses the other side of the top plate.

12. The anti-fall mechanism of claim 9, wherein the self-locking mechanism comprises a first inclined block, a second inclined block and a driving assembly, an actuating end of the driving assembly is connected to the first inclined block, the second inclined block is arranged such that an inclined surface of the second inclined block is opposite an inclined surface of the first inclined block, and the driving assembly is configured to drive the first inclined block to slide relative to the second inclined block.

13. The anti-fall mechanism of claim 12, wherein the self-locking mechanism further comprises a fixed seat, the driving assembly comprises a second spring, the fixed seat is installed on the conveying platform, the fixed seat is provided with a vertical first through hole which is configured as extending through a top end of the fixed seat, the second spring is located in the first through hole, and two ends of the second spring are respectively in contact with a bottom end of the first inclined block and a bottom wall of the first through hole.

14. The anti-fall mechanism of claim 13, wherein the driving assembly further comprises a resisting column, the fixed seat is provided with the first through hole and a second through hole which are coaxially and vertically arranged, a diameter of the first through hole is larger than a diameter of the second through hole, the second through hole is configured as extending through a bottom end of the fixed seat, the resisting column passes through the first through hole and the second through hole, the second spring is installed on the resisting column, and the first inclined block abuts against the resisting column.

15. The anti-fall mechanism of claim 14, wherein the resisting column comprises a first column segment and a second column segment, a diameter of the first column segment is larger than a diameter of the second column segment, a top end of the second spring is in contact with a bottom end of the first column segment, and a top end of the first column segment abuts against the first inclined block.

16. The anti-fall mechanism of claim 14, wherein the self-locking mechanism further comprises a limiting block for preventing the resisting column from moving upward, and the limiting block is installed on the resisting column and located below the fixed seat.

17. The anti-fall mechanism of claim 12, wherein the self-locking mechanism further comprises a slider and a slide groove, the slider is slidable along the slide groove, the slide groove is oriented parallel to the inclined surface of the first inclined block, and the slider and the slide groove are respectively arranged on top surfaces of the first inclined block and the second inclined block.

\* \* \* \* \*